United States Patent [19]

Simons

[11] Patent Number: 4,705,343

[45] Date of Patent: Nov. 10, 1987

[54] INFRARED ZOOM TELESCOPE WITH DECENTERED DOME

[75] Inventor: David R. Simons, Torrance, Calif.

[73] Assignee: Hughes Aircraft Company, Los Angeles, Calif.

[21] Appl. No.: 855,039

[22] Filed: Apr. 23, 1986

[51] Int. Cl.[4] .............................................. G02B 13/14
[52] U.S. Cl. ..................................... 350/1.3; 244/3.1; 250/338; 350/571; 356/4
[58] Field of Search ................... 350/1.1, 1.2, 1.3, 571; 250/338; 356/4

[56] References Cited

U.S. PATENT DOCUMENTS 4,354,419 10/1982 Patterson ............................ 273/360
4,504,110 3/1985 Pittenger ............................... 350/1.3

Primary Examiner—John K. Corbin
Assistant Examiner—Martin Lerner
Attorney, Agent, or Firm—Ronald L. Taylor; A. W. Karambelas

[57] ABSTRACT

A protective dome (14) is provided for a zoom telescope (12) which is located therein. Telescope (12) can be used as an attachment to a prime imaging system (22) such as a FLIR (forward looking infrared). The dome (14) is mounted so that its center of curvature (16) is inboard of the outer skin (18) of the aircraft in order to reduce aerodynamic drag. The objective lens (24) of the telescope (12) is decentered with respect to a common axis (29) and the lenses of the zoom lens group (26) are tilted with respect to the common axis (29) to compensate for aberrations introduced by the decentered dome (14).

19 Claims, 3 Drawing Figures

INFRARED ZOOM TELESCOPE WITH DECENTERED DOME

BACKGROUND OF THE INVENTION

1. Technical Field

This invention relates to zoom lens systems, and more particularly, to such lens systems which are capable of operating in the infrared spectrum.

2. Background of the Invention

There are many applications for optical lens systems capable of operating in the infrared spectrum. For purposes of this invention, the term "infrared" means electromagnetic radiation having a wavelength longer than visible radiation and shorter than microwave radiation. The numerical wavelength range of the infrared spectrum is usually considered to extend from 0.7 microns which is the longest visible wavelength to substantially 100 microns. Infrared lens systems can be used as part of a night viewing surveillance device, an aircraft navigation device used to provide all weather and night flying capabilities, as well as known infrared radar and imaging systems. One such system is generally referred by the acronym "FLIR" derived from the words "forward looking infrared". These systems are preferably operated in the 2-20 micron wavelength region of the spectrum, more particularly in the 8-12 micron range.

It has been conventional practice to mount infrared optical sensors within a pod or turret mounted on the aircraft. Servomechanisms are used to rotate or otherwise articulate the pod to permit the sensor's field of view to be oriented in a variety of directions. For protection from the airstream, this sensor is usually mounted behind a protective window. The use of a flat window unfortunately creates a significant aerodynamic drag on the pod which can make movement of the pod difficult at high speeds. Accordingly, the use of a curved rather than a flat window in aircraft applications is desirable since a reduction in the aerodynamic drag would not only reduce the torque needed to be produced by the pod servomechanisms, but would also reduce the amount of fuel consumed by the aircraft as well as reduce mechanical vibrations on the pod or turret.

Even further reductions in aerodynamic drag can be produced if the curved window consists of a shell or dome of material having a band pass in the infrared spectrum, such as zinc selenide, zinc sulfide or germanium. Unfortunately, these domes generally possess weak negative optical power, and create spherical aberrations, and chromatic aberrations. In addition, if the optical sensor is positioned along a line which does not pass through the center of the dome, i.e., if the dome is decentered, additional aberrations such as axial coma are also introduced.

A variety of different attempts have been made to permit the use of this so-called "decentered" dome approach which is generally recognized as being necessary in supersonic aircraft applications where aerodynamic drag must be kept to an absolute minimum. Unfortunately, many of the prior approaches to correct these problems were relatively costly, often requiring additional lenses resulting in undesirable transmission losses, or provided generally unacceptable performance characteristics. In addition, these aberration compensation techniques were generally not capable of compensating for different amounts of dome decentration.

It is often also desirable to provide a zoom lens system that is capable of operating in the infrared spectrum which can be used as a "bolt on" attachment to a primary imaging system such as that encountered in conventional FLIR systems. Typically, the zoom system must be of the afocal type wherein the output of the zoom is a collimated beam of energy focused at infinity. Among the desirable design parameters is that the afocal infrared zoom provides small transmission losses while at the same time providing usefully high image quality. As noted above, transmission losses are particularly acute with lenses having a spectral bandpass in the infrared region. Consequently, both from a cost and performance standpoint the number of lenses must be kept to a minimum. In addition, a compact design is also highly desirable.

In addition to the design objectives noted above, there exists a need for an infrared zoom lens system capable of providing continuous-in focus field of view of a scene (i.e., afocal type), with the zoom lens being capable of a relatively large magnification ratio while providing the capability of having a unit magnification power (1.0×) mode of operation and at the same time providing a compact structure. The capability to provide a unit power zoom position is important for navigation applications which require the displayed scene to correspond exactly to the actual scene the pilot would see with direct viewing. The unit power zoom position would provide the pilot with the exact field of view necessary to fly his aircraft.

Those skilled in the art can thus appreciate that a variety of advantages could be obtained if it were possible to provide a zoom lens telescope system that can be used with a decentered dome. For example, low aerodynamic drag can be achieved while at the same time providing the primary imaging system with the advantages of a zoom lens attachment.

SUMMARY OF THE INVENTION

Pursuant to the present invention, a zoom telescope is provided which is capable of being used with a decentered, as well as a centered dome. A simple but extremely powerful method of aberration correction is provided to compensate for aberrations introduced by the decentered dome when used. According to this invention, the compensation for different amounts of dome decentration can be accomplished by changing the decentration of a fixed objective lens in the zoom telescope and the tilt of the optical axis of the lens elements behind the fixed objective in the telescope.

In the preferred embodiment, a dome of optical material is mounted to an aircraft such that the center of curvature of the dome is inboard of the outer skin of the aircraft. As a result, the extent of the projection of the dome from the outer skin of the aircraft is kept to a minimum thereby reducing aerodynamic drag. The zoom telescope is located within the protective dome. The zoom telescope includes a fixed objective lens and a zoom lens group. The centers of curvatures of the dome and objective lens are decentered with respect to a common axis. The optical axis of the lenses of the zoom lens group is tilted with respect to the common axis. Both the tilt of the zoom lens group and the decenter of the objective lens compensate for aberrations created by the decentered dome. The tilt of the zome lens group also serves to realign the line of sight due to the decenter of the dome and of the objective.

BRIEF DESCRIPTION OF THE DRAWINGS

The various advantages of the present invention will become apparent to those skilled in the art by reading the following specification and by reference to the drawings in which.

DETAILED DESCRIPTION OF THE PREFERRED EMBODIMENT

Figure 1:
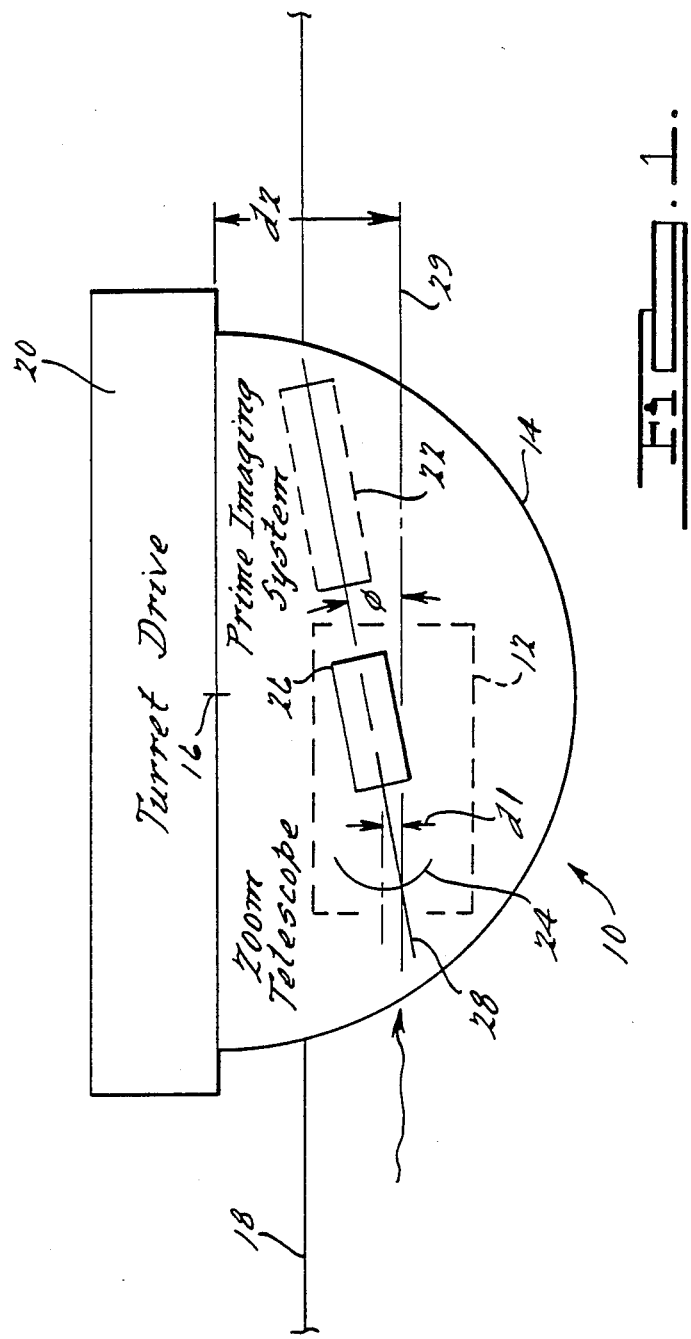
FIG. 1 is a diagrammatic side view of an optical sensing system made in accordance with the teachings of the present invention which includes a zoom telescope used in conjunction with a decentered dome.

Applicant's contribution to the art can best be understood by reference to the drawings and, in particular, to FIG. 1 which diagrammatically illustrates the relationship of the various components of the optical system of the present invention. The optical system is generally designated by the numeral 10 and includes a zoom telescope 12 mounted within the protective confines of a zinc selenide hemispherical dome 14. The dome 14 and elements of the zoom telescope 12 are made of materials that have a useful spectral bandpass in the infrared wavelength region, preferably in the 8-12 micron range. The dome is mounted to an aircraft such that the center of curvature 16 thereof is inboard of the outer skin 18 such as the fuselage of the aircraft. Such a mounting arrangement is referred to as a "decentered" dome and is characterized by a reduction in aerodynamic drag because the projection of the dome 14 outside of the skin 18 is kept to a minimum. A suitable turret drive 20 is provided for pointing the zoom telescope 12 in various directions at the scenes desired to be imaged. Telescope 12 is typically designed to be attached to a primary imaging system generally designated by the numeral 22 in FIG. 1. Such imaging systems conventionally include a prime imaging lens of fixed focal length. Accordingly, the zoom telescope 12 is of the afocal type wherein the output thereof is a collimated beam of energy focused at infinity capable of being subsequently imaged by the prime imaging system 22.

Telescope 12 includes two major components; namely, a fixed objective lens 24 and a zoom lens group 26 including one or more moveable zooming lenses. Each of the lenses in group 26 have a common optical axis 28, i.e., the centers of curvatures of each of the lens elements in group 26 lie on the same line. Optical axis 28 is tilted with respect to an imaginary or common axis 29. The common axis 29 is an arbitrary axis parallel to the dome's centered axis and the objective's centered axis. As is known in the art, the centered axis for the dome 14 and objective lens 28 are defined by lines passing through their respective centers of curvatures. Objective lens 24 is decentered by a given amount d1 with respect to common axis 29. Likewise, the center of curvature of dome 14 is decentered with respect to common axis 29 by an amount d2 which is larger than d1. The tilt of the optical axis 28 of the zoom lens group 26 and the decenter d1 of the fixed objective lens 24 compensates for the abberations introduced by the decentered dome. The amount of tilt and decenter is chosen so as to introduce equal and opposite (in sign) amounts of aberrations as compared to those aberrations created by the decentered dome.

Figure 2:
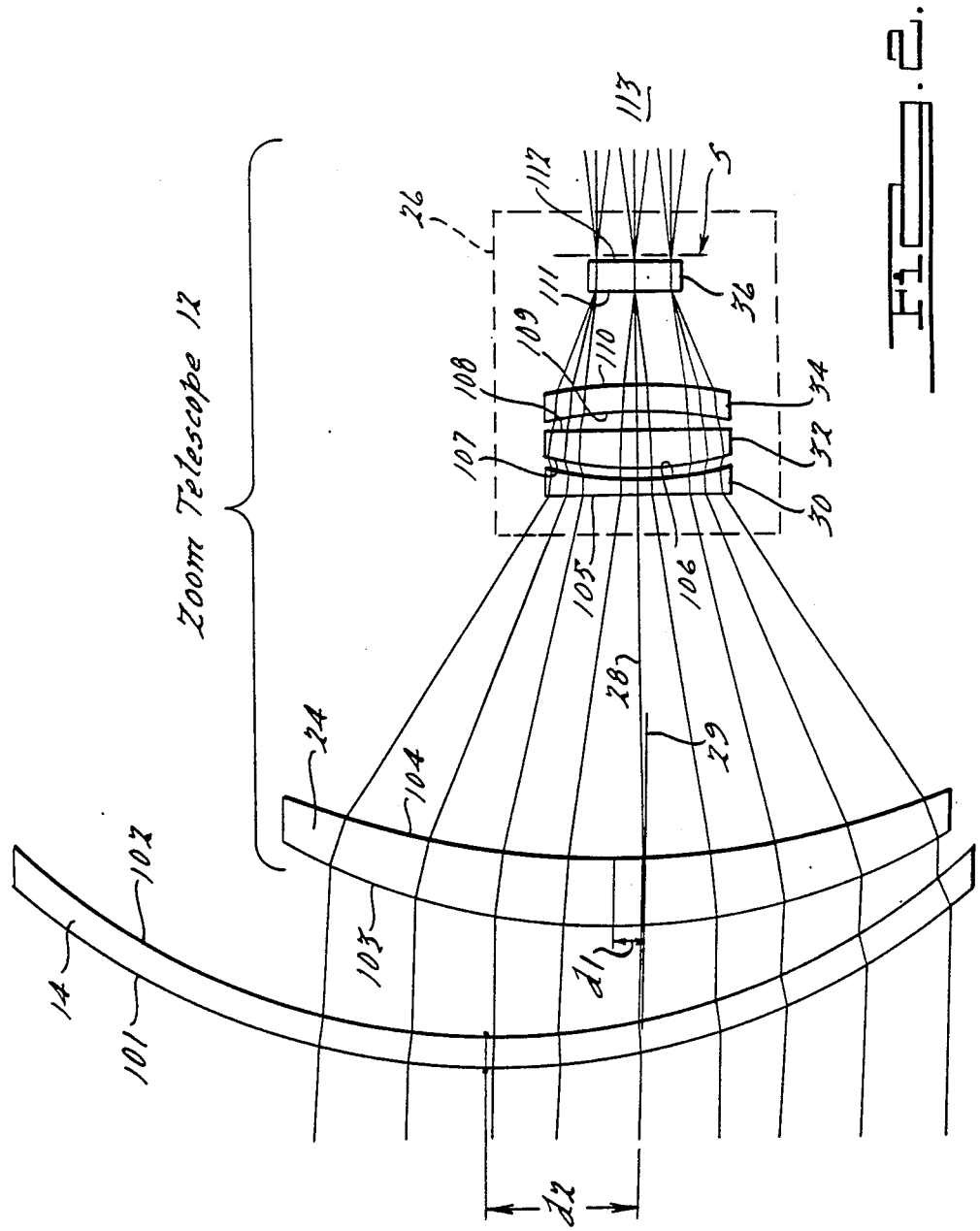
FIG. 2 is an enlarged optical schematic view of a segment of the dome together with the zoom telescope showing the zooming lenses in the highest magnification position.

FIG. 2 illustrates in more detail the optical system of the present invention including a segment of dome 14 and telescope 12 mounted therein, with the lenses of zoom lens group 26 shown in the highest magnification position. Group 26 includes a front zooming element 30 consisting of a single negative or diverging germanium lens. Lenses 32 and 34 are combined to form a doublet wherein the lens 32 consists of a germanium positive meniscus lens and lens 34 consists of a zinc selenide negative meniscus lens. The zinc selenide lens 34 is used to correct for chromatic aberrations and its focal length is approximately −13.2 times in relationship to that of lens 32 so that the doublet provides a converging or positive action. Lens 36 is a germanium negative lens that is moveable and serves as a rear zooming element.

Figure 3:
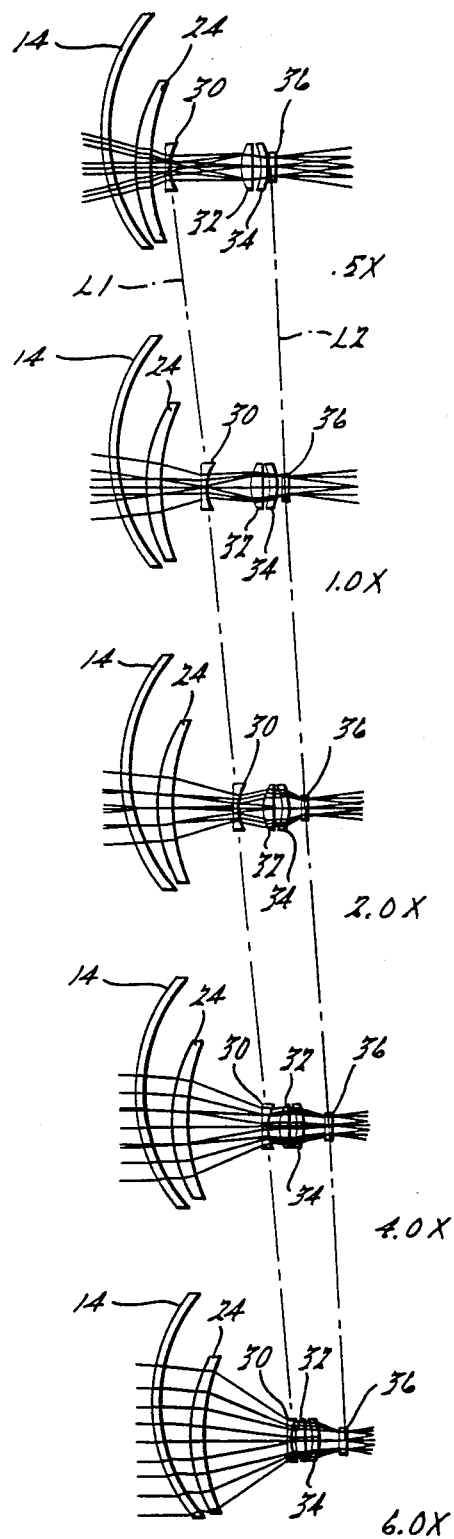
FIG. 3 is an optical schematic view of the dome segment and zoom telescope showing the lens elements of the system in various positions between minimum and maximum magnifications and indicating the loci or zoom track of the moveable lenses between these two positions.

The zooming action of lenses 30 and 36 is controlled by conventional cam mechanisms so that both groups are always at the same magnification value point along their respective loci L1 and L2, respectively, as shown in FIG. 3. Their motion between such points results in a continuous change in system magnification from 0.5× minimum to 6.0× maximum thereby providing a 12:1 magnification ratio.

The first four lenses 24, 30, 32 and 34 can be though of cooperating to form a compound objective lens system for the telescope while lens 36 is used as a recollimating lens. FIG. 3 illustrates the various positions of the zoom lenses 30 and 36 at various magnification positions. In the low magnification position shown at the top of FIG. 3, the front zoom lens 30 is positioned close to the main objective lens 24. Thus the lenses in the telescope 12 are each located in positions that create an inverse telephoto Galilean form. By inverse telephoto Galilean form, it is meant that a positive compound inverse telephoto objective lens is combined with a negative recollimating lens to form a Galilean or non-reimaging telescope. This is created in the position shown in the 0.5× magnification schematic in FIG. 3 because the lenses 24, 30, 32 and 34 form a compound objective whose focal length is less than the overall length of the zoom lens system, i.e., from surface 101 to surface 112. The surfaces of the lenses bear reference numerals as shown in FIG. 2. The dome 14 includes surfaces 101 and 102; objective lens 24 has surfaces 103 and 104; lens 30 has surfaces 105 and 106; lens 32 has surfaces 107 and 108; lens 34 has surfaces 109 and 110; and lens 36 has surfaces 111 and 112.

In this embodiment, the front zoom element 30 moves in a nonlinear path along loci L1 while the rear zoom element 36 also moves in a nonlinear path along loci L2. In the highest magnification position (6.0×), the front negative zoom lens 30 and the positive fixed lens 32 combine to create a weak negative doublet. In order to create this weak negative doublet from lenses 30 and 32, the focal length of lens 30 must be smaller and of opposite sign in relationship to that of the positive lens 32. Thus, the lenses 24, 30, 32, 34 and 36 of the telescope are arranged in a Galilean formn wherein the combined focal length defined by lenses 24, 30, 32, and 34 is longer than the length of the telescope lens system. In other words, in the highest magnification position, the image focal plane would lie to the right of lens 36. The rear zoom element 36 and the aperture stop S are moved together to maintain collimation of the output beam and to hold the diameter of the on-axis exit beam to a constant value.

The optical system of the present invention is fabricated in accordance with the constructional data given in Table I below. The figures for the radii and all other magnitudes are given in inches. The radius refers to the radius of curvature of the particular surface specified in accordance with conventional practice. The thickness refers to the distance along the element's centered axis from the surface for which the thickness is stated to the next highest numbered surface. Thus, the thickness from surface 101 to the surface 102 of dome 14 is 0.4 inch. (The variable thickness 106 and 110 are listed in the 6.0× position in Table I) The various thicknesses through air between the surface 106 of front zoom lens 30 to the surface 107 of fixed positive lens 32 is given in Table II set forth below under the column headed THK 106. The various dimensions of THK 106 correspond to different magnification settings of the lens system along the locus L1 of the movement of the front zoom element 30. A similar notation is used for other fixed and variable distances. All of the lenses are germanium having an index of refraction of about 4.003 except lens 34 and dome 14 which are zinc selenide having an index of refraction of about 2.407. All of the lens surfaces are spherical except for surface 104 which is an ellipsoidal surface having a conic constant of −0.14099. The column heading labeled "clear Apert", according to conventional practice, refers to minimum clear apertures which is a parameter defining the diameter of the aperture which permits all radiation within the specified field of view to pass through the surface without vignetting.

TABLE I

| Lens/Surface | | Radius | Thickness | Mat'l | Clear Apert. |
|---|---|---|---|---|---|
| 14 | 101 | 10 | .4 | ZNS | 13 |
|    | 102 | 9.6 | 1.5 | Air | 13 |
| 24 | 103 | 8.82423 | .922570 | Ge | 9 |
|    | 104 | 13.0612 | 4.83699 | Air | 9 |
| 30 | 105 | −32.8127 | .225423 | Ge | 2.5 |
|    | 106 | 4.91401 | .120226 | Air | 2.5 |
| 32 | 107 | 4.91401 | .503540 | Ge | 2.5 |
|    | 108 | 149.657 | .212875 | Air | 2.5 |
| 34 | 109 | −8.37443 | .375705 | ZNSE | 2.5 |
|    | 110 | −11.7272 | 1.29296 | Air | 2.5 |
| 36 | 111 | −11.1089 | .347516 | Ge | 1.01502 |
|    | 112 | 13.1784 | 1.50116 | Air | 1.24294 |
|    | 113 | Infinite Exit Interface Plane | | | |

TABLE II

| Magnification | THK 106 | THK 110 |
|---|---|---|
| 0.5 × | 4.1327555 | .12022562 |
| 1.0 × | 2.7045704 | .45939181 |
| 2.0 × | 1.6146241 | .91462940 |
| 4.0 × | .70954573 | 1.3801483 |
| 6.0 × | .120226 | 1.29296 |

In addition to the constructional details shown in the foregoing tables, the preferred embodiment calls for the dome 14 and objective lens 24 to be decentered from the common axis 29 and for the optical axis 28 of the zoom lens group 26 to be tilted with respect to the common axis 29. As noted above, the common axis is defined as an arbitrary axis parallel to the dome's centered axis and the objective's centered axis. In the preferred embodiment, the dome decentered distance d2 is 2 inches whereas the objective lens 24 decenter distance d1 is 0.34 inch. The angle of the tilt of the zoom group optical axis 28 with respect to the common axis 29 is labeled as $\phi$ in FIG. 1 where this angle $\phi$ is greatly exaggerated. The tilt of the zoom lens group optical axis and the decenter d1 of the objective lens is determined by the shape and placement of the dome, i.e., radii, thickness, decenter and location in front of the zoom lens. In the preferred embodiment the angle $\phi$ is 0.16°.

Those skilled in the art can appreciate that the present invention provides various advantages. A decentered or low profile protective dome can be used while at the same time providing a zoom lens capability for prime imaging system such as an optical sensing system of a FLIR. The fixed front element or objective lens in the zoom lens is used to compensate for decentration of the dome and no other additional lenses are required to accomplish this function. It is possible to compensate for different amounts of dome decenter by changing the decenter of the zoom objective lens and tilt of the optical axis of the remaining lens in the zoom telescope. Acceptable image quality is obtained without requiring modification to a concentric dome (all spherical surfaces) which is comparatively easy to manufacture. The optical system of the present invention enables the zoom telescope to be gimballed about the center of curvature of the dome, if desired, without introducing any additional aberrations. This enables scanning or pointing behind a decentered dome.

Various other modifications and advantages of the present invention will become apparent to one skilled in the art upon a study of the drawing specification and following claims.

What is claimed is:

1. A method of imaging a scene from an aircraft, said method comprising:
   mounting a dome of optical material to an aircraft such that the center of curvature thereof is inboard of the outer skin of the aircraft;
   locating a zoom telescope having an objective lens and a zoom lens group within the dome such that the centers of curvature of the dome and the objective lens are decentered with respect to a common axis defined by an imaginary line parallel to the optical centered axes of both the dome and the objective lens; and
   tilting the optical axis of the lenses of the zoom lens group with respect to the common axis whereby the tilt of the optical axis of the zoom lens group and the decenter of the objective lens compensate for the aberrations introduced by the decentered dome.

2. The method of claim 1 wherein the dome is decentered a greater distance from the common axis than the objective lens.

3. The method of claim 2 wherein the dome is decentered a distance of about 2 inches whereas the objective lens is decentered a distance of about 0.34 inch.

4. The method of claim 3 wherein the angle of the tilt of the optical axis of the zoom lens group is about 0.16 degrees.

5. The method of claim 4 wherein the dome and telescope comprise optical elements capable of operating in the infrared spectrum.

6. The method of claim 5 wherein the telescope is of an afocal type, with the zoom lens group including two moveable lenses and two fixed lenses, and the moveable lenses being located on opposite sides of one of the fixed lenses.

7. An optical system for use with an aircraft having an outer skin, said system comprising:
   a dome of optical material mounted to the aircraft such that the center of curvature thereof is inboard of the outer skin of the aircraft;
   a zoom telescope located within the dome, said telescope including an objective lens and a zoom lens group, the centers of curvatures of the dome and the objective lens being decentered with respect to a common axis defined by an imaginary line parallel to the centered optical axes of the dome and objective lens; and
   said zoom lens group being tilted with respect to the common axis whereby the tilt of the optical axis of the zoom lens group and the decenter of the objective lens compensate for aberrations introduced by the decentered dome.

8. The system of claim 7 wherein said dome and said telescope comprise optical materials capable of operating in the infrared spectrum.

9. The system of claim 8 wherein said dome is decentered from the common axis by a greater distance than said objective lens.

10. The system of claim 9 wherein said dome is decentered about two inches from the common axis, with the objective lens being decentered about 0.34 inch from the common axis.

11. The system of claim 10 wherein the zoom lens group is tilted at an angle of about 0.16 degrees from the common axis.

12. The system of claim 11 wherein the zoom lens group includes:
   a front negative zoom lens disposed between the objective lens and a second fixed lens group, and further including a rear negative zoom lens disposed on an opposite side of the second fixed lens group, and further including means for moving the zoom lenses between a first position defining a maximum magnification power wherein the front zoom lens is disposed adjacent the second fixed lens group to form a negative lens group, with said means moving the zoom lenses to a second position defining a minimum magnification power wherein the front zoom lens is spaced from the second fixed lens group.

13. The system of claim 12 wherein said second fixed lens group comprises a doublet having a germanium positive meniscus lens and a zinc selenide meniscus lens.

14. The system of claim 12 wherein the objective lens has a rear ellipsoidal surface.

15. The system of claim 12 which includes an aperture stop mounted for movement with the rear zoom lens.

16. An optical system for imaging a scene from an aircraft having an outer skin, said system comprising:
   a protective hemispherical dome made of optical material having a bandpass in the 8–12 micron region, said dome being mounted to the aircraft such that its center of curvature is inboard of the outer skin of the aircraft;
   an afocal zoom telescope mounted within the dome adapted for use with a prime imaging system, said telescope including four optically coacting lens groups, each of said groups comprising at least one lens, each of said lenses having a useful spectral bandpass in the infrared wavelength region, the first group being a fixed focused front objective element, the second group being a fixed zooming element moving in a first locus, the third group being fixed and including a positive lens, and the fourth group being a rear zooming element moving in a second locus;
   said telescope including means to continuously vary the magnification of said system between minimum and maximum limits, adapted to simultaneously move said second and fourth group of zooming elements through predetermined loci having a predetermined relationship to each other, at least one of said loci being nonlinear, said four groups of lenses of the telescope when positioned to produce said minimum magnification of said system being arranged in relationship to each other so as to create an inverse telephoto Galilean form, and wherein said four groups of lenses when in the maximum magnification position are arranged so that the front zoom element of the second group is positioned adjacent the positive lens in the third group to form a weak negative doublet;
   the optical system having a common axis defined by an imaginary line parallel to the centered optical axes of the dome and objective lens, the objective lens being decentered from the common axis by about 0.34 inch and said dome being decentered from said common axis by about two inches, with the lenses of the telescope except for the objective lens having an optical axis which is tilted from the common axis by about 0.16 degrees.

17. The system of claim 16 wherein the lens groups are positionable so as to provide a unitary (1.0×) magnification power.

18. The system of claim 16 which further includes an aperture stop mounted for movement with the rear zooming element to thereby maintain collimation of the output beam for the system and to hold the diameter of the on-axis exit beam to a constant value.

19. The system of claim 16 wherein the dome and zoom telescope comprise the elements shown in FIG. 2 of the drawings and wherein the elements are fabricated and mounted in accordance with the following prescription Tables I and II, wherein "radius" refers to the radius of curvature of the surface element indicated by the corresponding number, the "thickness" refers to the distance along the optical axis of the particular element from the indicated surface to the surface for which the thickness is stated to the next highest numbered surface, and the materials and outer diameters are as specified, all of the surfaces being spherical except for the objective lens whose rear surface is ellipsoidal and has a conic constant of −0.14099, the measured quantities being stated in inches as follows:

TABLE I

| Lens/ | Surface | Radius | Thickness | Mat'l | Clear Apert. |
|---|---|---|---|---|---|
| 14 | 101 | 10 | .4 | ZNS | 13 |
|  | 102 | 9.6 | 1.5 | Air | 13 |
| 24 | 103 | 8.82423 | .922570 | Ge | 9 |
|  | 104 | 13.0612 | 4.83699 | Air | 9 |
| 30 | 105 | −32.8127 | .225423 | Ge | 2.5 |
|  | 106 | 4.91401 | .120226 | Air | 2.5 |
| 32 | 107 | 4.91401 | .503540 | Ge | 2.5 |
|  | 108 | 149.657 | .212875 | Air | 2.5 |
| 34 | 109 | −8.37443 | .375705 | ZNSE | 2.5 |
|  | 110 | −11.7272 | 1.29296 | Air | 2.5 |
| 36 | 111 | −11.1089 | .347516 | Ge | 1.01502 |

TABLE I-continued

| Lens/Surface | Radius | Thickness | Mat'l | Clear Apert. |
|---|---|---|---|---|
| 112 | 13.1784 | 1.50116 | Air | 1.24294 |
| 113 | | Infinite Exit Interface Plane | | |

TABLE II

| Magnification | THK 106 | THK 110 |
|---|---|---|
| 0.5 × | 4.1327555 | .12022562 |
| 1.0 × | 2.7045704 | .45939181 |
| 2.0 × | 1.6146241 | .91462940 |
| 4.0 × | .70954573 | 1.3801483 |
| 6.0 × | .120226 | 1.29296 |

* * * * *